United States Patent
Egawa et al.

(10) Patent No.: US 7,661,867 B2
(45) Date of Patent: Feb. 16, 2010

(54) SPREAD ILLUMINATING APPARATUS AND DISPLAY DEVICE INCORPORATING SAME

(75) Inventors: Motoji Egawa, Kitasaku-gun (JP); Takashi Edamitsu, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 12/068,526

(22) Filed: Feb. 7, 2008

(65) Prior Publication Data
US 2008/0205079 A1 Aug. 28, 2008

(30) Foreign Application Priority Data
Feb. 27, 2007 (JP) ............................. 2007-047292

(51) Int. Cl.
*F21V 7/04* (2006.01)
(52) U.S. Cl. .................... 362/619; 362/621; 362/606; 362/231
(58) Field of Classification Search ................ 362/231, 362/603, 606, 617–627; 349/62, 64, 65, 349/68
See application file for complete search history.

(56) References Cited

U.S. PATENT DOCUMENTS

| 7,333,165 | B2 * | 2/2008 | Nakano et al. | 349/68 |
| 7,484,875 | B2 * | 2/2009 | Kim et al. | 362/612 |
| 2005/0254771 | A1 * | 11/2005 | Yamashita et al. | 385/146 |
| 2007/0064443 | A1 * | 3/2007 | Dunn | 362/612 |
| 2007/0247870 | A1 * | 10/2007 | Sakai et al. | 362/612 |
| 2007/0247871 | A1 * | 10/2007 | Yoo | 362/612 |
| 2007/0258240 | A1 * | 11/2007 | Ducharme et al. | 362/231 |
| 2008/0151527 | A1 * | 6/2008 | Ueno et al. | 362/84 |

FOREIGN PATENT DOCUMENTS

| JP | A 2000-244021 | 9/2000 |
| JP | A 2001-319514 | 11/2001 |
| JP | A 2005-183124 | 7/2005 |
| JP | A 2005-203326 | 7/2005 |

\* cited by examiner

*Primary Examiner*—Thomas M Sember
(74) *Attorney, Agent, or Firm*—Oliff & Berridge, PLC (57) ABSTRACT

A spread illuminating apparatus is provided which includes: a light conductor plate having a light inlet surface and two major surfaces; a light source unit disposed at the light inlet surface of the light conductor plate; and a light diffuser pattern disposed at the lower major surfaces of the two major surfaces of the light conductor plate, wherein the light source unit includes first and second white light sources which have respective different light emitting principles, are arranged in the width direction of the light conductor plate with their respective ends set close to one another, and which can be turned on and off independently of each other.

6 Claims, 5 Drawing Sheets

SPREAD ILLUMINATING APPARATUS AND DISPLAY DEVICE INCORPORATING SAME

BACKGROUND OF THE INVENTION

1. Field of the Invention

The present invention relates to a spread illuminating apparatus of side light type for use as a lighting means for a liquid crystal display device, and particularly to a spread illuminating apparatus suitable for use as a lighting means for a color liquid crystal display device for a compact mobile terminal, such as a mobile telephone.

2. Description of the Related Art

Currently, a spread illuminating apparatus of side light type in which a white light emitting diode (LED) as a primary light source is disposed at a side face (light inlet surface) of a light conductor plate is extensively used as a lighting means for a liquid crystal display (LCD) device with a relatively small display area for a compact mobile terminal, such as a mobile telephone. Such the white LED generally includes in combination a semiconductor light emitting element to emit a blue light and a fluorescent substance to absorb a blue light and emit a yellow light, whereby a spectrum distribution to produce a white light is developed (the white LED is referred to as "B+Y type LED").

Recently, a mobile terminal, such as a mobile telephone, increases its application and now functions as a video terminal to watch television programs, and a color LDC device for such the terminal is desired to present a high picture quality. The light emitted by the aforementioned B+Y type LED, however, is poor in a red spectral component and therefore is not perfectly suited for a video terminal to show television movies or the like which requires high color rending properties.

Under the circumstances described above, when high color rendering properties are required, an LED is used which includes in combination a semiconductor light emitting element to emit a blue light, a fluorescent substance to absorb a blue light and emit a red light, and another fluorescent substance to absorb a blue light and emit a light of a color other than red (for example, a yellow or green color), thereby realizing a spectrum distribution to produce a white light with enhanced color rendering properties (such the white LED is referred to as "B+RX type LED", where "X" may be, for example, "Y" for yellow or "G" for green) as disclosed in, for example, Japanese Patent Application Laid-Open No. 2000-244021.

The B+RX type LED, however, is inevitably deteriorated in visibility and conversion efficiency due to the increase of the red spectral component or achieves a smaller light beam than the B+Y type LED due to the increase of the fluorescent substance to absorb the blue light emitted from the semiconductor light emitting element.

The color rendering properties have been enhanced, for example, by employing a combination of a plurality of LEDs which incorporate respective semiconductor light emitting elements adapted to emit lights of respective different colors (typically, red, green and blue colors) as disclosed in, for example, Japanese Patent Application Laid-Open No. 2001-319514, or by employing an LED which includes such the respective semiconductor light emitting elements in one package (LED package) as disclosed in, for example, Japanese Patent Application Laid-Open No. 2005-183124 (the plurality of LEDs and the LED package are referred collectively as "RGB type LED" as appropriate). Such the RGB type LED emits a green light having a low luminance efficiency and therefore, like the B+RX type LED, achieves a smaller light beam than the B+Y type LED. And, furthermore, a power supply circuit is needed for each of the plurality of semiconductor light emitting elements, thus inviting a dimensional increase of the device.

The above-described LEDs of different types are adapted to emit white lights based on different light emitting principles and accordingly have different light emitting properties. Under such the circumstances, a spread illuminating apparatus is disclosed which incorporates a light source having the different types of white LEDs with the different light emitting principles in order to properly balance the luminance efficiency and the color rendering properties (refer to, for example, Japanese Patent Application Laid-Open No. 2005-203326).

Since a color LCD device for a mobile terminal, such as a mobile telephone, has a variety of usages in various environments, the properties of the light source have to be optimally controlled according to the usages and environments. For example, for reading characters in electronic mails, the color rendering properties do not necessarily have to be high, and the luminance efficiency receives priority. On the other hand, for watching pictures in the dark environments, the color rendering properties are important while a high brightness is not necessarily required. And, for use in the light environments, a high brightness is desired.

In the spread illuminating apparatus disclosed in, for example, the aforementioned Japanese Patent Application Laid-Open No. 2005-203326 where an illuminating light having specific properties is produced by simply turning on the different types of LEDs on a selective basis, it is difficult to achieve a decent brightness distribution across all lighting modes: specifically, the LEDs are all turned on at the same time, the LEDs are selectively turned on and off, and the like.

SUMMARY OF THE INVENTION

The present invention has been made in light of the above problems, and it is an object of the present invention to provide a spread illuminating apparatus in which the properties of a light source are appropriately set according to various usage purposes and environments while achieving an excellent brightness distribution.

According to one aspect of the present invention, a spread illuminating apparatus is provided which includes: a light conductor plate having a light inlet surface and two major surfaces; a light source unit disposed at the light inlet surface of the light conductor plate; and a light diffuser pattern disposed at least one of the two major surfaces of the light conductor plate, wherein the light source unit includes plural kinds of white light sources to emit white light having respective different light emission spectra are arranged close to one another.

In the one aspect of the present invention, the plural kinds of light sources of the light source unit may be: a first white light source including a semiconductor light emitting element and a wavelength converting substance; and a second white light source including a semiconductor light emitting element and two wavelength converting substances, wherein white lights emitted by the first and second white light sources have respective different light emission spectra.

In the one aspect of the present invention, the light source unit may be structured such that the plural kinds of white light sources to emit white lights having respective different light emission spectra are arranged in a thickness direction of the light conductor plate.

In the one aspect of the present invention, the plural kinds of white light sources may be put in an integrated structure.

In the one aspect of the present invention, the plural kinds of white light sources may be put in one package component.

According to another aspect of the present invention, a display device is provided which incorporates the spread illuminating apparatus according to the one aspect described above, in which the plural kinds of white light sources are controlled to turn on and off independently of one another.

In the illuminating apparatus described above, the property of illumination light can be optimally varied according to various usage purposes and environments and at the same time an excellent brightness distribution can be achieved. Especially, such the illuminating apparatus can be favorably used as a lighting means for a color LCD device for use in a mobile terminal, such as a mobile telephone.

DETAILED DESCRIPTION OF THE INVENTION

Exemplary embodiments of the present invention will hereinafter be described with reference to the accompanying drawings. It is to be noted that the drawings are provided for the purpose of explanation and may not accurately reflect actual configuration and dimension.

Figure 1A:
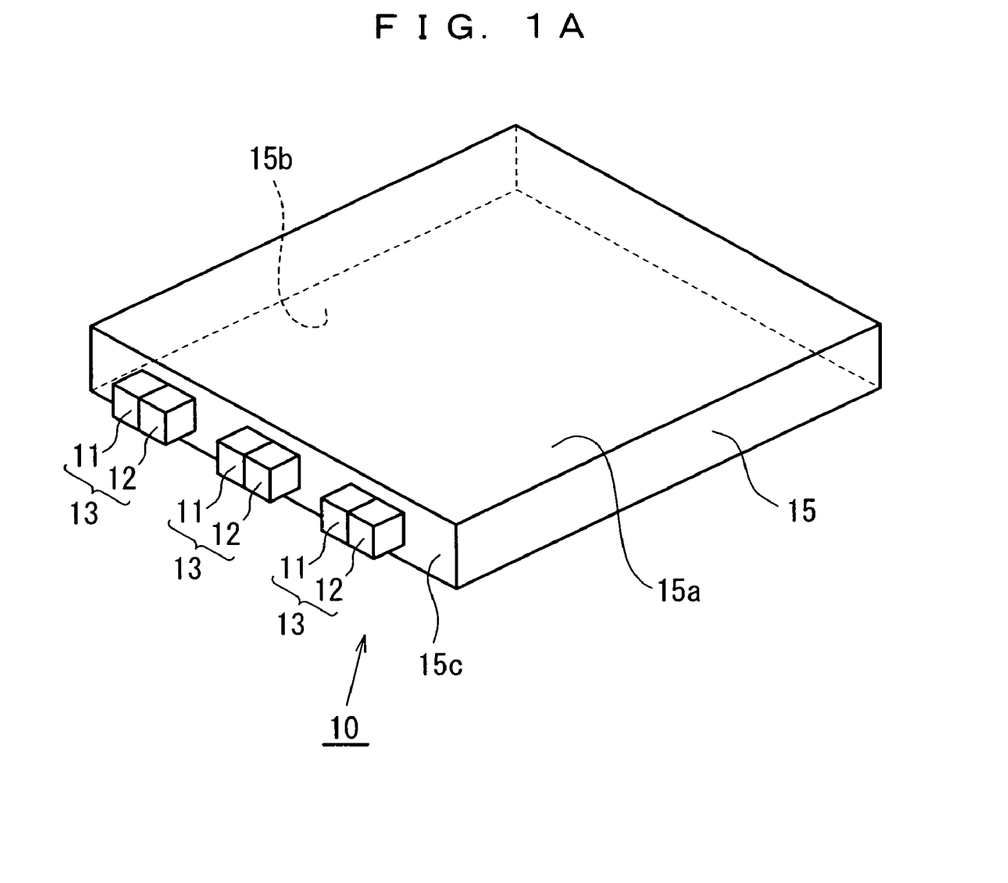
FIG. 1A is a perspective view of a spread illuminating apparatus according to a first embodiment of the present invention.

Referring to FIG. 1A, a spread illuminating apparatus 10 according to a first embodiment of the present invention generally includes a light conductor plate 15, and a plurality (three in the figure) of light source units 13 disposed at one side surface (light inlet surface) 15c of the light conductor plate 15.

The light conductor plate 15 is preferably produced such that a light transmissive resin, for example, polycarbonate resin is injection molded into a plate shape. Usually, an optical path converting means (not shown) to convert the direction of light is provided at one (lower side in the figure) major surface 15b (hereinafter, referred to as "lower major surface" as appropriate), whereby light introduced into the light conductor plate 15 from the light inlet surface 15c, while traveling inside the light conductor plate 15, is caused to exit from the other (upper side in the figure) major surface 15a (hereinafter, referred to as "upper major surface) in a uniform manner.

The light source units 13 are each constituted such that a first white LED 11 and a second white LED 12 having their respective different light emitting principles are arranged in the direction along the length (horizontally in the figure) of the light inlet surface 15c of the light conductor plate 15, that is the width direction of the light conductor plate 15, with their respective one ends set close to each other. The light source units 13 thus structured are arrayed at regular intervals along the longitudinal direction of the light inlet surface 15c of the light conductor plate 15.

The first white LED 11 basically includes a semiconductor light emitting element to emit a blue light, and a yellow fluorescent member to convert wavelength so as to thereby change a blue light into a yellow light (first wavelength converting substance). The first white LED 11 is usually constituted such that the semiconductor light emitting element is sealed with a light transmissive resin which is mixed with the yellow fluorescent member, wherein a white light emission spectrum is developed such that a blue light coming directly and intact from the semiconductor light emitting element is mixed with a yellow light which is emitted from the yellow fluorescent member through excitation by the blue light. Thus, the first white LED 11 is a B+Y type LED.

The second white LED 12 basically includes a semiconductor light emitting element having the same nature as the semiconductor light emitting element of the first white LED 11 thus emitting a blue light, a green light fluorescent member to convert wavelength so as to thereby change a blue light into a green light (second wavelength converting substance), and a red light fluorescent member to convert wavelength so as to thereby change a blue light into a red light (third wavelength converting substance). When the lighting emitting element of the second white LED 12 has the same nature as that of the first white LED 11 as described in the present embodiment, the driving circuit can be simplified, which results in downsizing and cost reduction of the apparatus.

The second white LED 12 is usually constituted such that the semiconductor light emitting element is sealed with a light transmissive resin mixed with the green and red light fluorescent members, wherein a white light emission spectrum is developed such that the following three color lights are mixed together: a blue light coming directly and intact from the semiconductor light emitting element; a green light emitted from the green fluorescent member through excitation by the blue light; and a red light emitted from the red fluorescent member through excitation by the blue light. Thus, the second white LED 12 is a B+RG type LED.

In the spread illuminating apparatus 10, individual driving currents are supplied by a driving circuit (disposed outside the apparatus and not shown) respectively to the first and second white LEDs 11 and 12 of the light source unit 13, whereby the first and second white LEDs 11 and 12 are turned on and off independently of each other so that it can happen selectively that only the first white LED 11 is turned on, or only the second white LED 12 is turned on, or both the first and second white LEDs 11 and 12 are turned on.

Figure 1B:
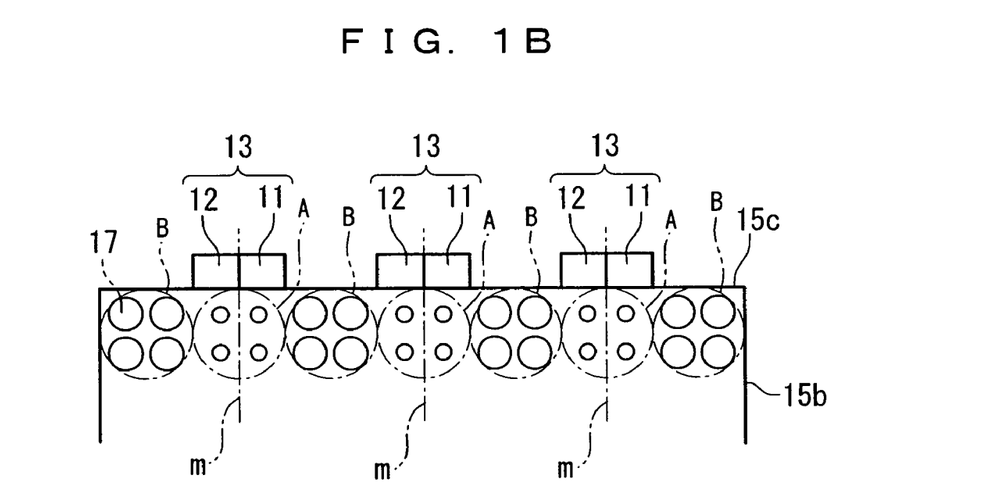
FIG. 1B is a schematic top plan view of a relevant portion of the spread illuminating apparatus of FIG. 1A.

Referring to FIG. 1B, a light diffuser pattern 17 is formed at an area of the lower major surface 15b of the light conductor plate 15 located close to the light inlet surface 15c. The light diffuser pattern 17 includes a plurality of regions A each located in front of the light source unit 13 so as to occupy at its center a chained line m which goes through the center of the light source unit 13, that is positioned halfway between the light emitting centers of the first and second white LEDs 11 and 12, and a plurality of regions B each located between two adjacent regions A. The area density of the constituent pieces (circular dots in the figure) arranged in the region A is lower than that arranged in the region B.

In the embodiment described above, the light diffuser pattern 17 is composed of an arrangement of two kinds of circular dots having respective different area sizes from each other, but the present invention is not limited to such the arrangement, and the light diffuser pattern 17 may be otherwise constituted insofar as the area density of the constituent pieces in the region A located in front of the light source unit 13 is lower than that in the region B. Also, while the light diffuser pattern 17 is formed directly on the light conductor plate 15 in the embodiment, the present invention is not limited in such a mode of forming the light diffuser pattern 17, and the light diffuser pattern 17 may be formed by painting white on the appropriate area of the light conductor plate 15, or the appropriate area of the light conductor plate 15 may be constituted by a rugged surface. Further, a constituent member adapted to function as the light diffuser pattern 17 may be disposed at the lower major surface 15b of the light conductor plate 15. And, the light diffuser pattern 17 may be provided at the upper major surface 15a, or at both the lower surface 15b and the upper surface 15a.

Description will now be made on the operation of the spread illuminating apparatus 10 structured as described above.

Since the light source unit 13 includes the first and second white LEDs 11 and 12 which can be turned on and off independently of each other, it can happen selectively that only the first white LED 11 is turned on, or only the second white LED 12 is turned on, or both the first and second white LEDs 11 and 12 are turned on, whereby the properties of the light source unit 13 can be optimally determined according to the usage purpose and environment.

The first white LED 11, which is a B+Y type LED, is poor in a red spectral component because of its white light emitting principle but has a high luminance efficiency. On the other hand, the second white LED 12, which is a B+RG type LED, has a high color rendering property because of its white light emitting principle but has a lower visibility and a lower conversion efficiency due to an increased red spectral component therefore achieving a smaller light beam than the first white LED 11 constituted by a B+Y type LED.

If the spread illuminating apparatus 10 is used with a color LCD device for a mobile terminal device, such as a mobile telephone, and when reading characters in electronic mails, the illuminating light does not necessarily to have a high color rendering property but is preferred to have a high luminance efficiency, and consequently only the first white LED 11 is turned on. When watching pictures in the dark, since the color rendering property is important and a high brightness is not necessarily required, only the second white LED 12 is turned on. And when the device is used in the light, a high brightness is top priority, and both the first and second white LEDs 11 and 12 are turned on. Thus, the light source unit 13 is adapted to optimally operate in terms of luminance efficiency, color rendering property, brightness, and the like according to the usage purposes and environments of the device.

The operation of the spread illuminating apparatus 10 including the light source unit 13 and the light diffuser pattern 17 is further described with reference to FIGS. 2A and 2B.

Figure 2A:
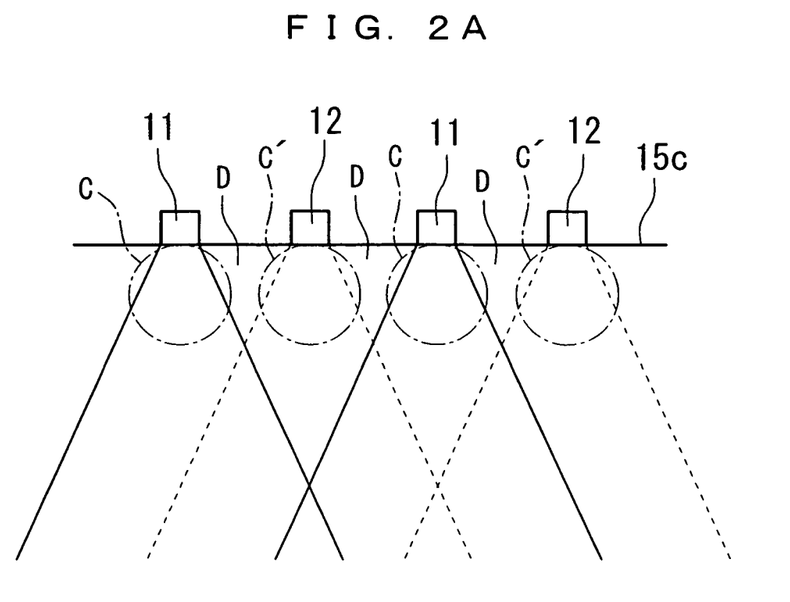
FIG. 2A is an explanatory view of a brightness distribution by a conventional spread illuminating apparatus.
Figure 2B:
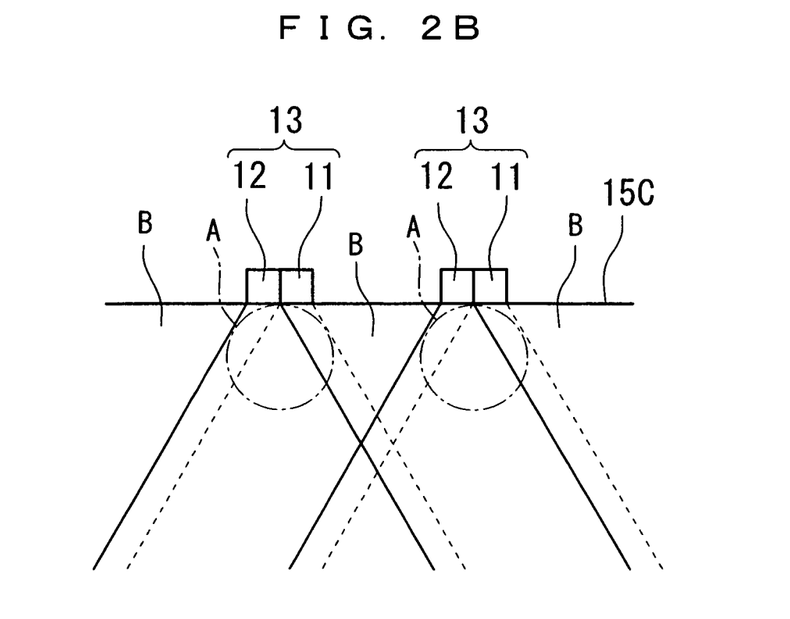
FIG. 2B is an explanatory view of a brightness distribution by the spread illuminating apparatus of FIG. 1A.

Referring to FIG. 2A, in order to enhance the uniformity of illuminating light exiting from a conventional spread illuminating apparatus in which all of two kinds of LEDs, first and second white LEDs 11 and 12, are to be turned on at all times, the first and second white LEDs 11 and 12 are preferably arrayed alternately at regular intervals at a light inlet surface (15c) of a light conductor plate and at the same time a light diffuser pattern is formed at an area of one major surface of the light conductor plate close to the light inlet surface (15c) such that the area density of the constituent pieces arranged in regions C and C' located respectively in front of the first and second white LEDs 11 and 12 is lower than that in regions D each located between the regions C and C'.

However, in the spread illuminating apparatus structured as described above, for example, when only the first white LED 11 is turned on, the region C' which is located in front of the second white LED 12 and provided with pattern constituent pieces having a low area density becomes dark thus causing non-uniformity in brightness.

On the other hand, in the spread illuminating apparatus 10 according to the first embodiment of the present invention, the light source units 13, each of which is composed of the first and second white LEDs 11 and 12 located close to each other and thereby is regarded as a single light source, are arrayed at the light inlet surface 15a along the width direction of the light conductor plate 15 as described above. Referring to FIG. 2B, the illuminating area of the first white LED 11 is indicated by dotted lines while the illuminating area of the second white LED 12 is indicated by solid lines, wherein both of the illuminating areas of the first and second white LEDs 11 and 12 are covered by the region A of the light diffuser pattern 17. Accordingly, regardless of whichever of the first and second white LEDs 11 and 12 is turned on, or if both thereof are turned on, the brightness uniformity can be decently maintained across the area of the light conductor plate 15 located close to the light inlet surface 15c through the same pattern arrangement that the area density of the constituent pieces in the region A located in front of the light source unit 13 is lower than that in the region B. This effect is preferable especially when the main lighting mode is that all white LEDs of a light source unit are turned on.

In the embodiment described above, the light diffuser pattern 17 is arranged such that the center of the region A coincides with the center of the light source unit 13, that is the halfway line between the respective light emitting centers of the first and second white LEDs 11 and 12. The present invention is not limited to such the arrangement, and the center of the region A may alternatively be located closer to the light emitting center of the first white LED 11 or closer to the light emitting center of the second white LED 12 according to the turn-on frequency of the first and second white LEDs 11 and 12.

The first and second white LEDs 11 and 12, which constitute the light source unit 13, are packaged separately from each other in the embodiment, but the first and second white LEDs 11 and 12 may be formed into one package unit though not shown.

While the present invention is not limited to any specific LED structure, a preferred structure as the first and second white LEDs 11 and 12 of the light source unit 13 will be described with reference to FIGS. 3A and 3B.

Figure 3A:
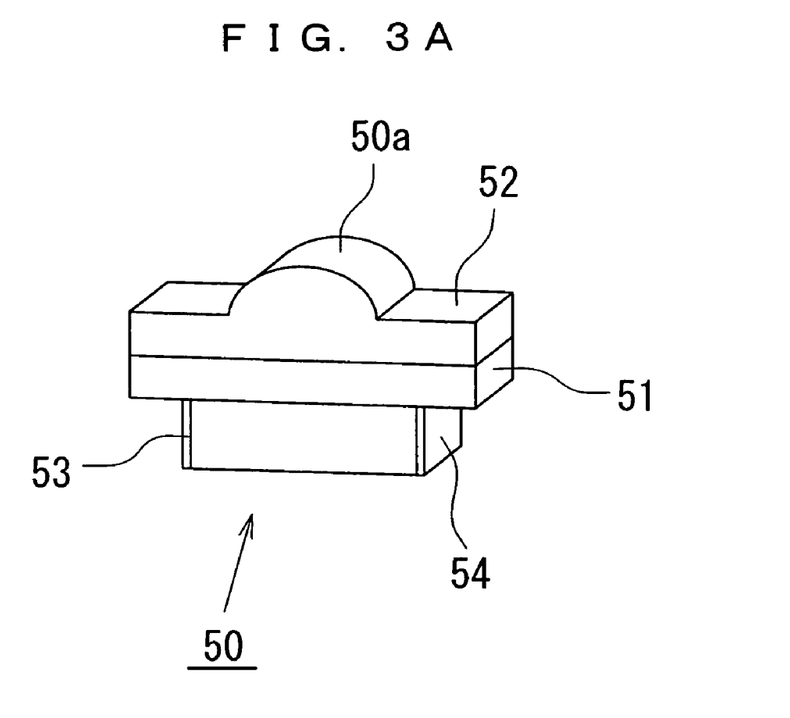
FIG. 3A is a perspective view of a white LED as s white light source for the spread illuminating apparatus of FIG. 1A.

Referring to FIG. 3A, an LED 50 includes: a base portion 51; a semiconductor light emitting element (not shown) mounted on the base portion 51; a resin portion 52 which is light transmissive, seals the semiconductor light emitting element, and which is not provided with a lamp house (cover); and a pair of electrodes 53, 54 disposed under the base portion 51 and adapted to flow currents to the semiconductor light emitting element. The resin portion 52 has a rounded protrusion 50a at its front face (light emitting face) and includes a layer containing one or more fluorescent members appropriately mixed. When a yellow fluorescent member is contained in the layer of the resin portion 52 while the semiconductor light emitting element emits a blue light, the LED 50 constitutes the first white LED 11, and when green and red fluorescent members are contained in the layer of the resin portion 52 while the semiconductor light emitting element emits a blue light, then the LED 50 constitutes the second white LED 12. And, the first and second white LEDs 11 and 12 described above are arranged with their respective one ends set close to each other, and the light source unit 13 is constituted.

Figure 3B:
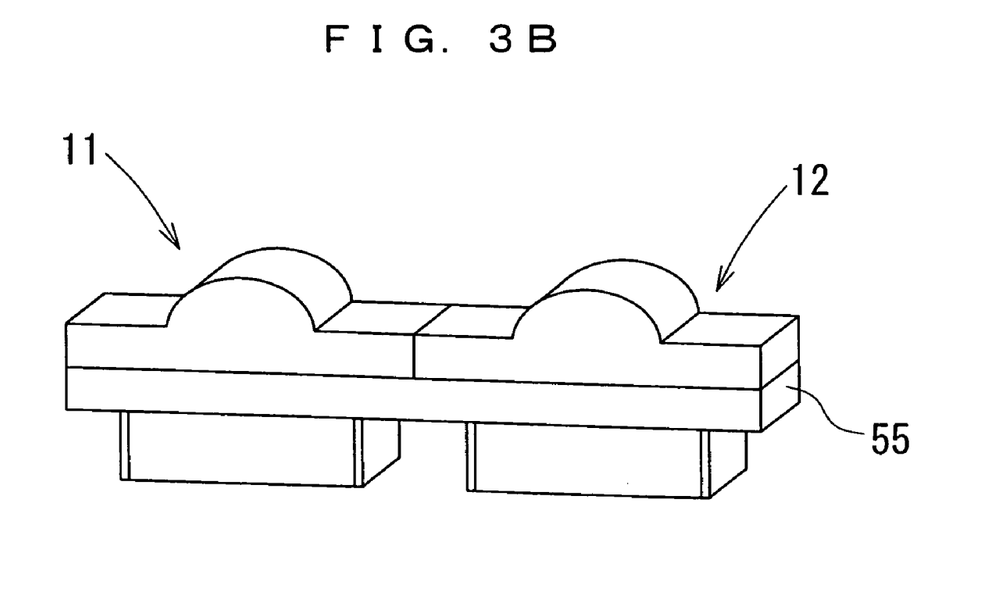
FIG. 3B is a perspective view of two of the white LEDs of FIG. 3A set to constitute a light source unit.

Referring to FIG. 3B, the first and second white LEDs 11 and 12 may share a common base portion 55, rather than having the respective separate base portions 51, thus forming an integrated structure, which contributes to providing a firm connection, an easy handling, and an enhanced productivity.

Figure 4:
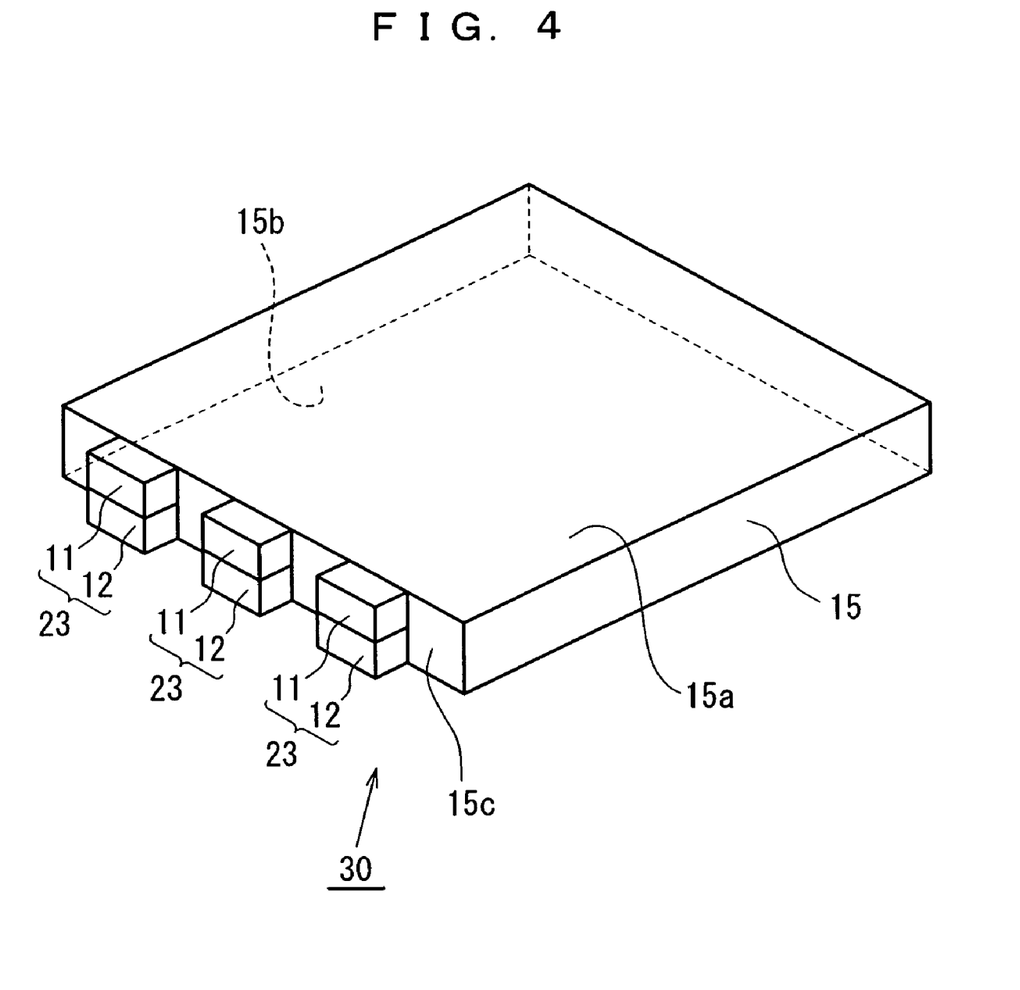
FIG. 4 is a perspective view of a spread illuminating apparatus according to a second embodiment of the present invention.

A second embodiment of the present invention will be described with reference to FIG. 4. A spread illuminating apparatus 30 according to the second embodiment generally includes a light conductor plate 15, and a plurality (three in the figure) of light source units 23 disposed at a light inlet surface 15c of the light conductor plate 15. The spread illuminating apparatus 30 has basically the same structure as the spread illuminating apparatus 10 according to the first embodiment but differs therefrom in the structure of the light source unit 23. The light source unit 23 is constituted such that first and second white LEDs 11 and 12 are arranged along the thickness direction (vertically in the figure) of the light conductor plate 15 with their respective one sides set close to each other, rather than along the width direction of the light conductor plate 15 with their respective one ends set close to each other. This arrangement is suitable when the light conductor plate 15 has a thickness large enough for stacking two LEDs.

In this arrangement, the light emitting centers of the first and second white LEDs 11 and 12 substantially coincide with each other in top plan view, and therefore the brightness distribution at the area near the light inlets surface 15c of the light conductor plate 15 can be maintained further uniform regardless of the turn-on condition of the first and second white LEDs 11 and 12.

Figure 5:
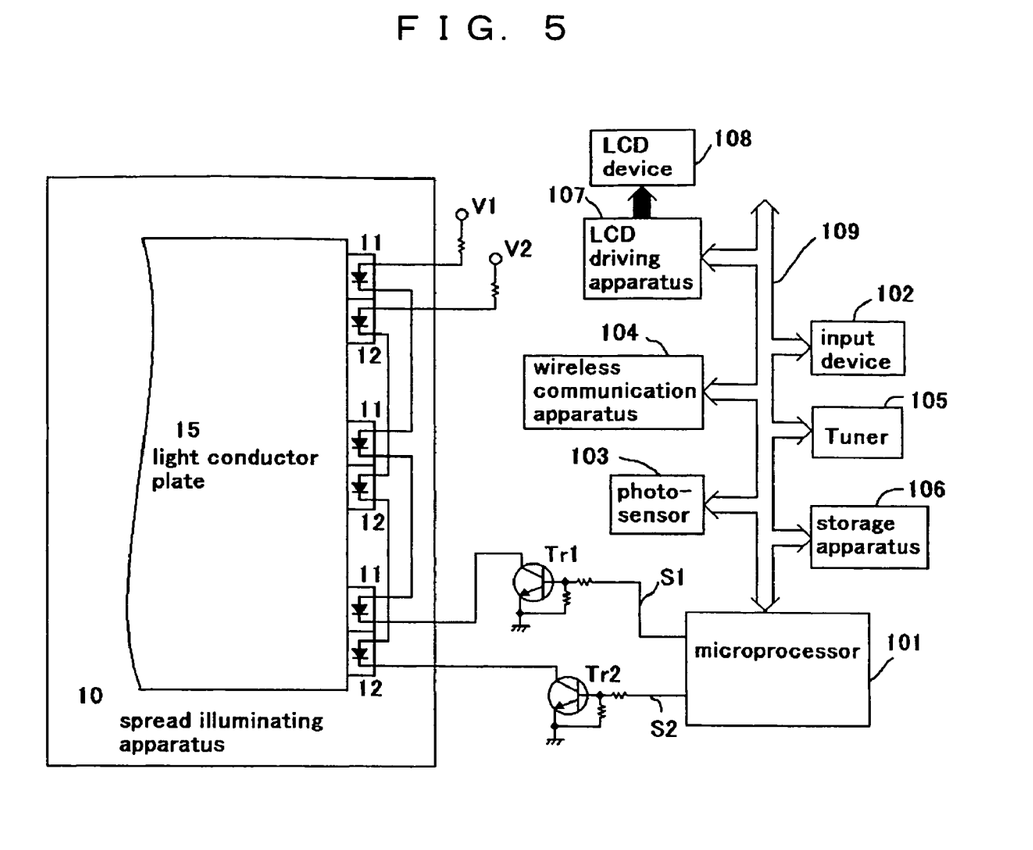
FIG. 5 is a block diagram of a display device incorporating a spread illuminating apparatus according to the present invention.

Description will now be made on a display device which incorporates a spread illuminating apparatus according to the present invention. In this description, the above-described spread illuminating apparatus 10 of the first embodiment will be taken as an example.

Referring to FIG. 5, the plurality of first white LEDs 11 are connected to one another in series, and the plurality of second white LEDs 12 are connected to one another in series while the two series connections of first and second white LEDs 11 and 12 are wire independently of each other. A DC voltage V1 is applied to the anode of the series connection of the first white LEDs 11 while a transistor Tr1 is connected to the cathode thereof, and a DC voltage V2 is applied to the anode of the series connection of the second white LEDs 12 while a transistor Tr1 is connected to the cathode thereof. The two transistors Tr1 and Tr2 are adapted to be switched on and off independently of each other, whereby the first white LEDs 11 can be turned on and off independently of the second white LEDs 12.

The transistors Tr1 and Tr2 are driven by respective control signals S1 and S2 from a microprocessor 101. When the control signal S1 is at high level, the transistor Tr1 is switched on and the first white LEDs 11 are turned on, and when the control signal S1 is at low level, the transistor Tr1 is switched off and the first white LEDs 11 are turned off. In the same way, the second white LEDs 12 are turned on and off according to the level condition of the control signal S2 via the transistor Tr2.

The LED connection is implemented at a printed circuit board attached to the spread illuminating apparatus 10, and the anode and cathode terminals are provided separately for the series connections of the first and second white LED 11 and 12. In this connection, the plurality of first/second LEDs 11/12 do not have to be connected to one another in series and may alternatively be connected in parallel.

In the display device, an input device 102, a photo sensor 103, a wireless communication apparatus 104, a TV tuner 105, and a storage apparatus 106 are connected via a bus 109 to the microprocessor 101. Also, an LCD driving apparatus 107 to provide an image signal to an LCD device 108 is connected to the microprocessor 102, wherein the spread illuminating apparatus 11 of the present invention functions as a lighting means for the LCD device 108.

The input device 102 includes, for example, a plurality of key switches and is used for operation, such as a character entry work. The microprocessor 101 determines what kind of information is displayed at the LCD device 108 based on the operation at the input device 102 thereby controlling the control signals S1 and S2, for example, as follows. When an e-mail received via the wireless communication apparatus 104 is displayed, only the control signal S1 is set at high level thereby lighting the first white LEDs 11 while the second white LEDs 12 remain turned off. When a TV signal received at the TV tuner 105, or an image signal of a move picture of the storage apparatus 106 is displayed, only the control signal S2 is set at high level thereby lighting the second white LEDs 12 while the first white LEDs 11 remain turned off. And, when the photo sensor 103 detects that the environment light exceeds a predetermined level, the control signals S1 and S2 are both set at high level thereby lighting both of the first and second white LEDs 11 and 12.

The disposition described above is an exemplar, and the lighting condition setting of the first and second white LEDs 11 and 12 can be selectively and optimally arranged. Also, the lighting condition of the first and second white LEDs 11 and 12 may be changed manually through operation at the input device 102.

While the present invention has been illustrated and explained with respect to specific embodiments thereof, it is to be understood that the present invention is by no means limited thereto. For example, the white LEDs to constitute the light source unit do not have to be constituted like the white LED 11 or 12 but may have any white light emitting principle corresponding to the light property required and may be employed in a number required. Also, in the embodiment, the description has been made based on the lighting mode that the first white LED 11 and/or the second white LED 12 are turned either on or off, but the lighting mode may be such that the brightness of the first and second white LEDs 11 and 12 is variably controlled by individually adjusting the currents applied thereto according to the usage purposes and environments, whereby the optimal lighting property can be achieved further finely.

What is claimed is:

1. A spread illuminating apparatus comprising:
   a light conductor plate having a light inlet surface and two major surfaces;
   a light source unit being disposed at the light inlet surface of the light conductor plate, the light source unit including plural kinds of white light sources that are arranged close to one another and that emit white lights having respective different light emission spectra; and
   a light diffuser pattern being disposed at least one of the two major surfaces of the light conductor plate, and being disposed at an area corresponding to the light source unit;
   wherein the light diffuser pattern is provided on at least one of the two major surfaces of the light conductor plate, the light diffuser pattern being located at an area close to the light inlet surface of the light conductor plate, and the light diffuser pattern includes a plurality of first regions that are located so as to face the light source unit in a light emitting direction of the light source unit and a plurality of second regions that are located between the first regions adjacently disposed, an area density occupied by the first regions being lower than an area density occupied by the second regions.

2. A spread illuminating apparatus according to claim 1, wherein the plural kinds of white light sources of the light source unit include:
   a first white light source comprising a semiconductor light emitting element and a wavelength converting substance; and
   a second white light source comprising a semiconductor light emitting element and two wavelength converting substances, and
   wherein white lights emitted by the first and second white light sources have respective different light emission spectra.

3. A spread illuminating apparatus according to claim 1, wherein the light source unit is structured such that the plural kinds of white light sources to emit white lights having respective different light emission spectra are arranged in a thickness direction of the light conductor plate.

4. A spread illuminating apparatus according to claim 1, wherein the plural kinds of white light sources are put in an integrated structure.

5. A spread illuminating apparatus according to claim 1, wherein the plural kinds of white light sources are put in one package component.

6. A display device comprising:
a spread illuminating apparatus, the spread illuminating apparatus including:
   a light conductor plate having a light inlet surface and two major surfaces;
   a light source unit being disposed at the light inlet surface of the light conductor plate, the light source unit including plural kinds of white light sources that are arranged close to one another and that emit white lights having respective different light emission spectra; and
   a light diffuser pattern being disposed at least one of the two major surfaces of the light conductor plate, and being disposed at an area corresponding to the light source unit;
the light diffuser pattern is provided on at least one of the two major surfaces of the light conductor plate, the light diffuser pattern being located at an area close to the light inlet surface of the light conductor plate, and the light diffuser pattern includes a plurality of first regions that are located so as to face the light source unit in a light emitting direction of the light source unit and a plurality of second regions that are located between the first regions adjacently disposed, an area density occupied by the first regions being lower than an area density occupied by the second regions;
wherein the plural kinds of white light sources are controlled to turn on and off independently of one another.

* * * * *